Aug. 19, 1930.          H. H. THOMPSON                1,773,411
                        GYROSCOPIC COMPASS
                    Filed Jan. 15, 1920         2 Sheets-Sheet 1
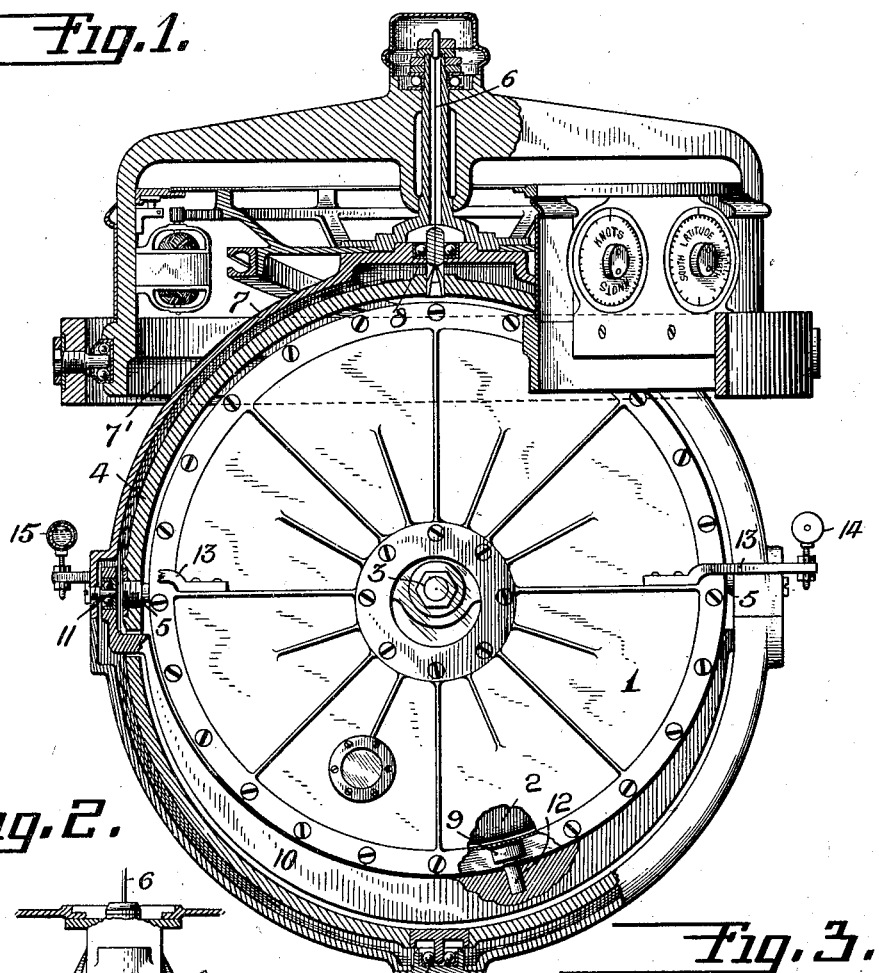
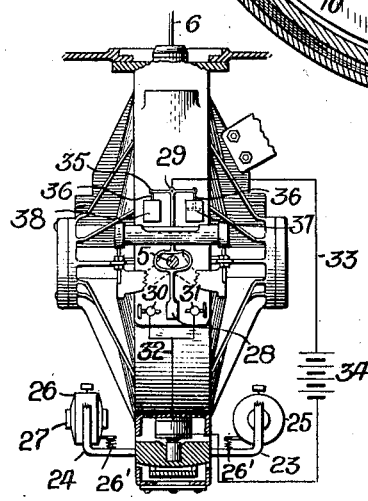
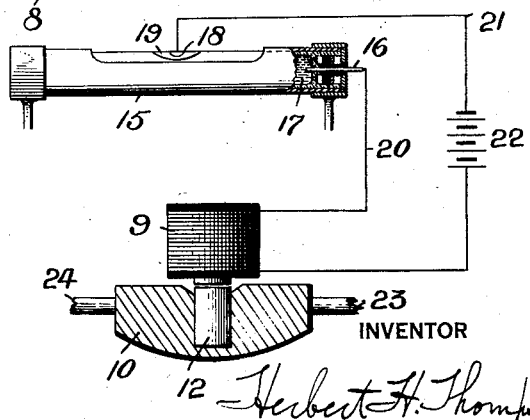
INVENTOR
Herbert H. Thompson

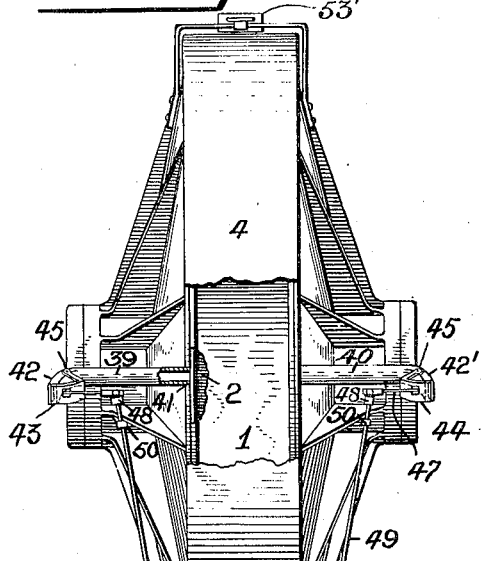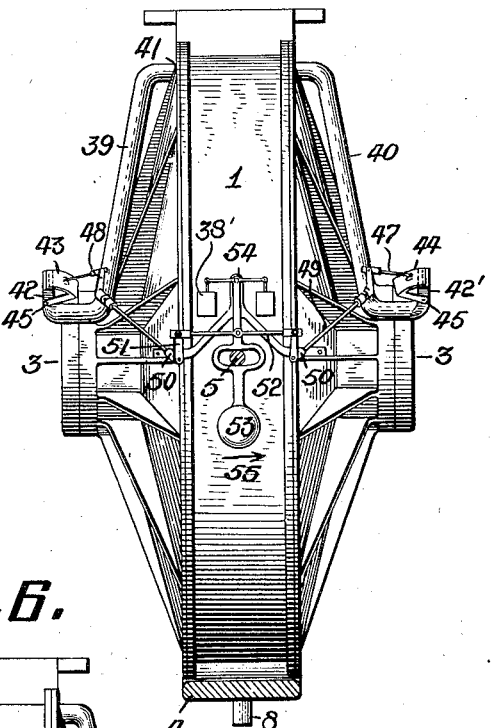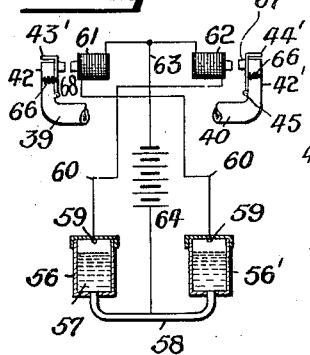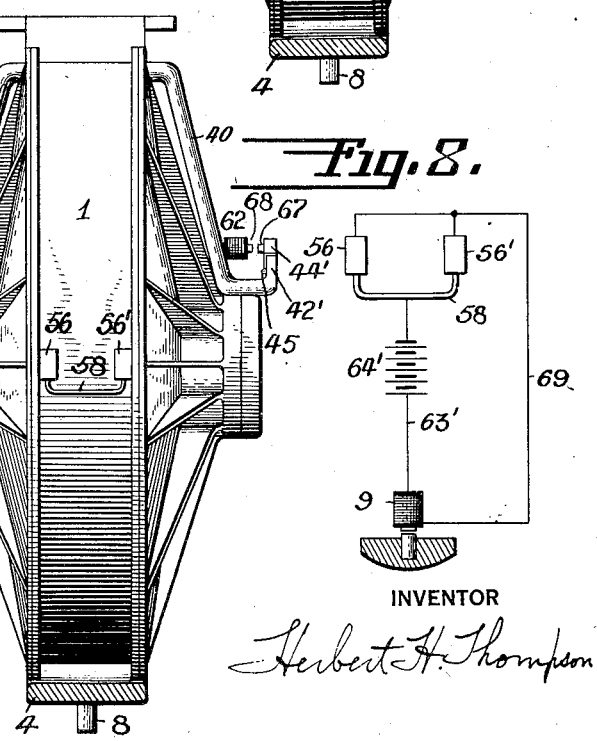

Patented Aug. 19, 1930

1,773,411

UNITED STATES PATENT OFFICE

HERBERT H. THOMPSON, OF BROOKLYN, NEW YORK, ASSIGNOR, BY MESNE ASSIGNMENTS, TO SPERRY GYROSCOPE COMPANY, INC., A CORPORATION OF NEW YORK

GYROSCOPIC COMPASS

Application filed January 15, 1920. Serial No. 351,635.

This invention relates to gyroscopic compasses for navigational purposes and has for its object the production of a compass in which the usual sources of error due especially to the effect of acceleration pressure in the compass arising from the rolling and pitching of the ship are eliminated. For this purpose the large pendulous factor of the compass has been either eliminated entirely or limited as to time of application. A further object of the invention is the simplification of damping means for the above and other types of compasses, by employing a damper of such a character as to avoid the necessity of any separate damping means.

The problem of elimination errors due to rolling and pitching of the ship is extremely difficult since, while such errors may be largely eliminated by making the gyroscope perfectly balanced about the horizontal axis, when such is done the meridian seeking properties of the gyroscope are lost. It is, therefore, essential that gravity influence be utilized in some manner by the gyroscope. It is also desirable that acceleration forces due to turning or change in velocity of the ship do not disturb the gyroscope, but on the other hand, the periodic type of compass requires a certain effect from such forces for the production of ballistic deflection. In solving this problem I have produced a gyroscopic compass in which the application of the torque causing the gyroscope to seek the meridian and of the damping torque is of such a character and controlled in such a manner as to reduce and substantially eliminate the introduction of forces due to the comparatively short period of the roll and pitch of the ship by causing the meridian applying torques and preferably also the damping torques to be responsive only to the long period movements of the gyroscope or compass about the meridian, in certain types of gyroscopic compasses only, to acceleration pressures due to changes in velocity of the ship.

My invention also has application to other types of gyroscopes besides the gyro-compass. It is applicable to any type in which it is necessary to have gravitational and/or damping control, my invention consisting essentially of means whereby the control is rendered effective only when necessary, leaving the gyroscope free from such control when conditions are such that undesirable oscillations of the gyroscope might be set up.

Referring to the drawings wherein I have shown what I now consider the preferred forms of my invention;

Fig. 1 is a south elevation, partly in section, of a compass embodying one form of the invention.

Fig. 2 is an end elevation, partly in section, of a portion of a compass showing a modification.

Fig. 3 is a wiring diagram showing one method of controlling the operation of the device.

Fig. 4 is a top view of the gyro casing showing a modified form of compass.

Fig. 5 is an end view of the same apparatus taken partly in section.

Fig. 6 is an end elevation of the gyroscope showing a modified method of controlling the torque producing device.

Fig. 7 is a wiring diagram of the system shown in Fig. 6.

Fig. 8 shows a modified method of controlling the torque producing means shown in Fig. 1.

In the drawings 1 represents the gyro casing within which is carried the gyro rotor 2 adapted to rotate on axis 3. Said casing is carried by a vertical ring 4 by means of horizontal trunnion bearings 5. Said casing is preferably made slightly pendulous about trunions 5. Ring 4 is in turn suspended by means of a torsion wire 6 from the follow-up element 7 and guided therein by vertical bearings 8. The relationship and workings of these elements is well known and need not be explained here.

Meridian seeking properties are imparted to the gyroscope (in whole or in part) by coupling it to a pendulously supported member, such as frame 7 supported in gimbal rings 7'. My preferred construction, however, is to employ a bail 10 shown as interposed between the gyroscope and frame, it being suspended from the follow-up element by means of bearings 11. Secured to and carried by the casing 1 slightly to one side of the vertical axis 8—8 is an electromagnet 9 adjacent which is provided an armature 12 carried by bail 10. Obviously the positions of said electromagnet and armature may be interchanged. Carried by brackets 13 mounted on the casing 1 are shown levels 14, 15. One of said levels may be provided with an electrode 16 engaging the liquid 17 which is adapted to conduct an electric current. A second electrode 18 is carried within said level at the middle thereof so as to be contained within the bubble 19 as shown when the compass is horizontal, but adapted to be engaged by the liquid when the compass is tilted. The liquid used is preferably sufficiently viscous and slow moving, such as syrup, to which enough salt is added to make the liquid a conductor so that the level is not to be materially affected by the short period roll or pitch of the ship but only by the long period oscillation of the compass about the meridian. My preferred form of level, however, uses mercury and is shown in Fig. 7 hereinafter described. Connected to said electrodes are shown wires 20, 21 running to electromagnet 9 through an electrical source 22. Extending laterally from the sides of the bail 10 are brackets 23, 24, carrying small stabilizing gyroscopes in gyro casings 25, 26. Gyro 25 may have its spinning axis in a horizontal east-west direction to stabilize the bail against swinging in an east-west plane, while gyro 26 may have its spinning axis 27 in a horizontal north-south direction to stabilize the bail against swinging in a north-south plane. Said gyroscopes may be connected by centralizing springs 26' to brackets 23.

The operation is as follows: The balance of the gyro casing about axis 5—5 is so adjusted that when the compass is on the meridian, it will be level and, therefore, the gyroscope will be supported in substantially three degrees of freedom and will not be subject to the acceleration pressures due to rolling and pitching. But when the axis 3 of the compass gyro oscillates back and forth across the meridian with the attendant tilting of said axis the bubble 19 in liquid 17 within the level 15, will move to one side or the other and the liquid will engage electrode 18 closing the circuit through electromagnet 9. The tilting of the gyro casing with respect to the stabilized bail will cause relative displacement of said magnet and the armature 12 so that the attraction set up between the magnet and armature by reason of the energization of said magnet will cause the bail to rise with the casing thereby causing a gravitational torque about axis 5—5, and at the same time, by reason of the eccentric position of said magnet, exert a torque upon the gyro about the vertical axis 8—8. The effect of these torques is to bring the axis 3 quickly to rest upon the meridian by reason of causing precession downwardly as well as orientation. A separate damping means is not, therefore, necessary.

The magnetic connection 9, 12 between the bail 10 and the rotor casing 1 is, of course, not as rigid as a mechanical coupling, in other words a certain amount of slip necessarily takes place depending on the strength and concentration of the magnetic field. Furthermore, as the period of the gyro compass in oscillating about the meridian depends upon the pendulousness of the same, or in other words upon the force exerted thereon, as its axis becomes inclined, it will be evident that if the weight of the bail is the same as now employed with the mechanical connection my compass would have a longer period and, further, that the period of oscillation may be varied by varying the strength of current through the magnet 9 or in other words varying the yielding properties of the connection. It has been found that for certain classes of work a compass with a period longer than the normal period of 85 minutes is preferable. In my compass a very long period may be produced without alteration in the weight of the bail or in the compass itself by merely varying the amount of current passing through the coil 9.

As shown in Fig. 2 I may employ a modified form of contact making device, comprising a pendulum 28, pivotally attached at 29 to the gyro casing 1. Also attached to casing 1 are a pair of contacts 30, 31 adapted to be engaged by said pendulum when the gyro casing tilts. By reason of the connection of magnet 9 to contacts 30, 31 through conductor 32 and the connection of the other side of said magnet to pendulum 28 through conductor 33 and source 34, engagement of the pendulum with either of said contacts will effect energization of the magnet 9, to dampen the oscillations as previously pointed out.

In order to lengthen the period of the pendulum 28 so that it will not respond to the comparatively short rolling period of a ship it may be provided with outwardly extending arms 35 connected through rods 36 to the pistons 37 of dash pots 38. The dash pots are adapted to resist quick movements of the pendulum, but to yield to slow movements thereof caused by the long period oscillations of the gyroscope 2, so that the damping effect of magnet 9 comes into play only in response to slow movements such as the oscillations of the compass about the meridian.

In Figs. 4 and 5 I have shown a modified method of imparting meridian seeking properties and of damping out the oscillations. In these figures the suspension means are not shown but it will be understood that similar means may be used to that shown in Fig. 1. The gyroscope is again supported on trunnions 5 at or near its center of gravity.

In this form I may employ a pair of tubes 39, 40 communicating with the interior of the gyro casing 1 as shown at 41, near the circumference thereof. These tubes may extend toward the axis 3—3, and be so curved that their nozzles 42, 42' may be substantially radially disposed with respect to axis 3, and in a direction lying between the vertical and horizontal planes passing through said axis. In other words, the said nozzles carried by the casing are so positioned that a jet of air issuing from either one thereof will produce a torque about the horizontal and vertical axes 5 and 8. The former may be either upwardly or downwardly so that the compass will rotate as a pendulous or a top heavy gyroscopic compass as the case may be. The said nozzles may be normally covered by thin caps 43, 44 hingedly connected at 45 to the tubes. These caps are connected by links 47 to lever arms 48 on a rod 49 adapted to rotate in bearings 50 carried by the casing. The opposite end of said rod may be provided with a similar lever arm 51 which is connected to a cross arm 52. Said arm 52 may be connected to a relatively small pendulum 53 pivoted at 54 on casing 2. Said pendulum is preferably strongly damped by means of dash pots 38' for the same reasons set forth in connection with pendulum 28 in Fig. 2. The balance of the casing may be retained by placing a counter weight 53' on the opposite side of casing 1. Such a weight (not shown) may also be provided in Fig. 2 to counterbalance the pendulum 28.

The operation of this form of the invention is as follows: The rotation of the rotor 2 will cause a whirling motion of the air in casing 1. Centrifugal force will then compress the air against the circumference of the casing, causing it to issue or to tend to issue through nozzles 42. When the gyroscope is hanging vertically the nozzles will be equally covered (or equally uncovered, as desired) by caps 43, 44 but when by reason of the slow tilting of the gyro casing the pendulum swings to one side caps 43, 44 will be rotated on their pivots 45. Presuming the nozzles to be covered and the pendulum to swing in the direction of arrow 55 (Fig. 5), said caps will rotate clockwise on their pivots so that cap 43 will uncover its nozzle while cap 44 by reason of its structure will pass over and cover the nozzle or at least not uncover it. By this or similar means a variation in the velocity of air issuing from the two jets is produced causing a torque about said axes 5 and 8 and effecting the results heretofore set forth. Movement of the pendulum in the opposite direction will, of course, effect the results in the reverse order. Several important advantages of the above described construction should be apparent which render it an ideal sea-going compass. Firstly, the gyroscope as a whole is substantially non-pendulous at all times, not only when on the meridian, but when oscillating.

There is a slight change, of course, in the pendulosity of the gyroscope when the pendulum 53 or the mercury in cups 56 hereinafter described changes position but the mass of said pendulum or mercury, as the case may be, and the relatively small amount of lateral displacement of the mass, which produces a very small lever arm, produces only a change in pendulosity which is negligible as compared to the pendulosity ordinarily employed for imparting meridian seeking properties. For instance, in the compass described in Fig. 1 the weight of bail 10 may be as high as fifteen pounds acting through a lever arm greater than the radius of the rotor while the mass or pendulum 53 may be as small as desired. Second, the damping means and the means imparting meridian seeking properties to the compass are one and the same so that no added damper need by employed. Such a torque which tends to bring the gyroscope directly back to its level position may be termed an erecting torque.

In Figs. 6 and 7 I have shown a modified method of controlling the opening and closing of nozzles 42, 42'. In this form I may employ a pair of containers or flasks 56, 56' containing mercury or other liquid 57 capable of conducting an electric current. Said flasks are secured to casing 1 slightly spaced apart and interconnected by a small tube 58 so that when the gyro casing tilts in the north-south plane the liquid will flow slowly from one flask to the other. Above the liquid in each flask is a contact 59 connected by wires 60 to electromagnets 61, 62. The opposite side of each of said magnets is connected by wire 63 through a source 64 to the liquid 57 by being connected to tube 58 or otherwise. The caps 43', 44' hinged at 45 to tubes 39, 40 and held normally in closed position by springs 66 are each provided with an armature 67 adjacent the core 68 of magnets 61, 62. When the gyro tends to oscillate about axis 5 through a long period, the liquid flowing from one flask to the other will engage one of the contacts 59 and complete a circuit through one or the other of electromagnets 61, 62. The constriction in tube 58 is sufficient to prevent any material flow due to ordinary acceleration forces of any description and thus this form of level is particularly adapted to the aperiodic type of compass. This in turn attracting the corresponding armature 67 will effect the opening of one of nozzles 42, 42' to cause the desired torque. In Fig. 7, the distance between the liquid 56, 56' and contacts 59 is somewhat exaggerated for clearness. It is to be understood that in practice this distance is very slight so that very little tilting of the gyro is necessary to close the circuit and bring the damping means into operation.

As shown in Fig. 8 I may control the energization of electromagnet 9 shown in Fig. 1 by the use of flasks 56, 56'. For this purpose both flasks are connected by wire 69 to one side of the magnet while tube 58 is connected through source 64' by wire 63' to the other side thereof. Tilting in either direction will thus effect energization of said magnet.

The flasks 56, 56' are preferably small so that the weight of the liquid transferred will not be sufficient to materially affect the balance of the gyroscope. However, the slight gravitational torque produced by the shifting liquid will be overcome by the magnetic coupling of the gyroscope and the bail 10.

Also, in connection with the pendulum 53 (Fig. 5), where the point of suspension 54 is above axis 5 so that a torque will be caused about said axis when the gyro tilts, the nozzles 42, 42' are so proportioned that the reaction of the air jet will be sufficient to overcome this torque in addition to performing its regular function.

In accordance with the provisions of the patent statutes, I have herein described the principle of operation of my invention together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a gyro compass, the combination with a gyroscope, means for mounting the same for turning about a vertical axis, and in neutral equilibrium for oscillation about a horizontal axis, a gravitationally restrained device connected thereto, a source of power, and means brought into action upon displacement of said device for causing said source of power to directly apply a single torque on said gyroscope about an axis which has a component about both the horizontal and vertical axes of the compass whereby both damping and meridian seeking properties are obtained.

2. The combination with a gyroscope, means for mounting the same with three degrees of freedom, a source of power for directly applying an erecting torque on the gyroscope, pendulous means for controlling said source of power, and means for preventing effective application of said source of power during the action of acceleration forces.

3. The combination with a gyroscope, means for mounting the same with three degrees of freedom, air blast means for applying an erecting torque on the gyroscope, pendulous means for controlling said air blast means, and means for reducing the effective torque which would otherwise be exerted on the gyroscope by said airblast means during the action of acceleration forces.

4. In a gyroscopic compass, a gyroscope casing mounted for freedom about a vertical and horizontal axis, a gyro rotor mounted for rotation therein, an air tube communicating with the interior of said casing having an outlet nozzle directed at an angle to the vertical and a horizontal axes of said casing, and means controlled by tilting of said casing for opening and closing said nozzle.

5. In a gyroscopic compass, a gyro casing, means for mounting the same for freedom about a vertical and horizontal axis, a rotor therein, a pair of air tubes communicating with the interior of said casing, each of said tubes being provided with a nozzle directed at an angle to the vertical and a horizontal axis of said casing so that air issuing from said nozzles will produce opposite torques about said axes, and means responsive to tilting of said casing for causing a variation in the relative velocities of air issuing from the respective nozzles.

6. In a gyroscopic compass, a gyro casing, a rotor therein, a pair of air tubes communicating with the interior of said casing, each of said tubes being provided with a nozzle directed at an angle to the vertical and a horizontal axis of said casing so that air issuing from said nozzles will produce opposite torques about said axes, a pair of intercommunicating containers adapted to contain a liquid carried by said casing, an electric contact carried by each container, and means controlled by the engagement of said liquid and said contacts for controlling the opening and closing of said nozzles.

7. In a gyro compass including a gyro casing and a gyro rotor mounted for rotation therein, means for mounting said casing for turning about a vertical axis and oscillation about a horizontal axis, a single means for applying torque about said vertical and horizontal axes of said rotor and casing, a pair of intercommunicating liquid containing flasks carried by said casing, and means controlled by the transfer of liquid between said flasks for controlling said torque applying means.

8. In a gyroscopic instrument, the combination with the gyroscope, of means for mounting the same for turning about vertical and horizontal axes passing through the center of gravity of the gyroscope, a pair of intercommunicating containers adapted to contain a liquid and carried by said gyroscope, normally inactive means for applying a torque on said gyroscope and electrical means responsive to change in the level of the liquid in said containers for bringing into action said torque applying means.

9. In a gyroscopic instrument, the combination with the gyroscope, of means for mounting the same for turning about vertical and horizontal axes passing through the center of gravity of the gyroscope, a pair of intercommunicating containers adapted to contain a liquid and carried by said gyroscope, electrically controlled means for applying a torque on said gyroscope and contacts adapted to be closed by rise of the liquid in either container for bringing into action said torque applying means.

10. The combination with a gyro compass having a sensitive element, means connected thereto adapted to impart meridian seeking and inclination reducing properties thereto, and means for rendering said means ineffective to eliminate each of said properties.

In testimony whereof I have affixed my signature.

HERBERT H. THOMPSON.